(12) United States Patent
Lai

(10) Patent No.: US 11,392,521 B2
(45) Date of Patent: Jul. 19, 2022

(54) HETEROGENEOUS COMPUTING SYSTEM AND HETEROGENEOUS COMPUTING METHOD USING THE SYSTEM

(71) Applicant: TCL CHINA STAR OPTOELECTRONICS TECHNOLOGY CO., LTD., Guangdong (CN)

(72) Inventor: Chinghong Lai, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 73 days.

(21) Appl. No.: 16/980,410

(22) PCT Filed: Apr. 29, 2020

(86) PCT No.: PCT/CN2020/087815
§ 371 (c)(1),
(2) Date: Sep. 13, 2020

(87) PCT Pub. No.: WO2021/208149
PCT Pub. Date: Oct. 21, 2021

(65) Prior Publication Data
US 2021/0318970 A1 Oct. 14, 2021

(30) Foreign Application Priority Data
Apr. 13, 2020 (CN) .......................... 202010284550.6

(51) Int. Cl.
*G06F 13/24* (2006.01)
*G06F 3/14* (2006.01)
(Continued)

(52) U.S. Cl.
CPC ............ *G06F 13/24* (2013.01); *G06F 3/1431* (2013.01); *G06F 13/409* (2013.01); *G06F 13/4221* (2013.01)

(58) Field of Classification Search
CPC ........ G06F 13/00; G06F 13/24; G06F 3/1431; G06F 13/409; G06F 13/4221
See application file for complete search history.

(56) References Cited

U.S. PATENT DOCUMENTS 5,488,385 A * 1/1996 Singhal ................. G06F 3/1431
345/3.1
RE49,057 E * 5/2022 Harada .............. H04N 5/23287
(Continued)

FOREIGN PATENT DOCUMENTS

| CN | 102156958 A | 8/2011 |
| CN | 109788293 A | 5/2019 |
| CN | 110730304 A | 1/2020 |

*Primary Examiner* — Henry Tsai
*Assistant Examiner* — Kim T Huynh
(74) *Attorney, Agent, or Firm* — The Roy Gross Law Firm, LLC; Roy Gross

(57) ABSTRACT

A heterogeneous computing system and a heterogeneous computing method using the system are provided and capable of executing accelerating running of a video algorithm. Furthermore, the heterogeneous computing system decreases the complexity of hardware design and the use of resources by pre-processing and simple operations. Furthermore, the required time for adjusting processes of software and hardware of the heterogeneous computing system can be efficiently decreased.

14 Claims, 3 Drawing Sheets

(51) Int. Cl.
   *G06F 13/40* (2006.01)
   *G06F 13/42* (2006.01)

(56) References Cited

U.S. PATENT DOCUMENTS

| | | | |
|---|---|---|---|
| 2003/0133608 A1* | 7/2003 | Bernstein | H04N 1/4097 382/163 |
| 2005/0222693 A1* | 10/2005 | Inoue | G01B 11/0608 700/28 |
| 2006/0290770 A1* | 12/2006 | LeBlanc | B41J 2/37 347/188 |
| 2008/0204465 A1* | 8/2008 | McGowan | G09G 5/008 345/547 |
| 2014/0115198 A1* | 4/2014 | White | G06F 13/26 710/48 |
| 2015/0279141 A1* | 10/2015 | Chen | G07D 7/121 382/135 |
| 2016/0092382 A1* | 3/2016 | Anvin | G06F 9/30054 710/269 |
| 2016/0182743 A1* | 6/2016 | Tachikawa | H04N 1/00798 358/1.15 |
| 2018/0295311 A1* | 10/2018 | Wang | H04N 1/00095 |
| 2021/0064757 A1* | 3/2021 | Nabar | G06F 13/28 |

* cited by examiner

HETEROGENEOUS COMPUTING SYSTEM AND HETEROGENEOUS COMPUTING METHOD USING THE SYSTEM

TECHNICAL FIELD

The present disclosure relates to a computing technology field, and more particularly to a heterogeneous computing system and a heterogeneous computing method using the system.

BACKGROUND

In an image processing field of display systems, in order to enhance viewing quality of an image or adjust characteristics of a display device, an image enhancement or inpainting algorithm is required. Then, an adjusted image is transmitted to the display device for display.

In a developing situation of a conventional algorithm, a general operating method is that a display-related algorithm is developed on a computing system and the algorithm is calculated on a selected image. Finally, effect of the image algorithm on a calculated output image is viewed and modified. In the developing mode, a common problem is that specific problems of image quality cannot be observed in a static image. When the output image has noises, the noises can be observed only if successive dynamic images are displayed. When static images are displayed dynamically, problems of long pre-processing time and image compression loss exist. Accordingly, heterogeneous computing systems are developed in some situations, so that the algorithm can be processed in real-time and effect can be viewed. When a problem of the output image is found, the algorithm can be modified and modified effect can be viewed.

Currently, common developments of algorithms of heterogeneous computing systems includes two types. In a first type of development, universal parallel operations are processed using GPU (or NPU). However, three stages including image data inputting, processing, and outputting exist, so a problem that a synchronous process cannot be performed effectively. In a second type of development using an FPGA (field programmable gate array) hardware acceleration mode, more manpower and time are required to integrate hardware and software systems besides a longer development schedule of FPGA. When modifications are required, an adjustment is necessary to integrate the systems as well.

Consequently, there is an urgent need to provide a new heterogeneous computing system and a heterogeneous computing method using the system.

SUMMARY OF DISCLOSURE

Embodiments of the present disclosure provide a heterogeneous computing system and a heterogeneous computing method using the system capable of simplifying a development schedule of software and hardware processes and computing resources and acquiring significant increasing of a running speed, so that it is convenient to develop and verify an image algorithm of a display system rapidly.

According to one aspect of the present disclosure, a heterogeneous computing system is provided and includes: an interrupt processing unit configured to monitor whether an interrupt request is received and transmit, when it is determined that the interrupt request is received, the interrupt request to a central processing unit, so as to run a corresponding process; an FPGA unit configured to execute hardware algorithm running and an input/output hardware implementation; an image input unit connected to the FPGA unit and the central processing unit and configured to acquire externally inputted image data and image data generated by the central processing unit, so that the central processing unit or the FPGA unit reads the image data; and a system memory unit connected to the central processing unit and the FPGA unit and configured to provide a storage space for the central processing unit and the FPGA unit; wherein the central processing unit is configured to coordinate system running, assist a calculation process, adjust a system process, and control an interrupt process; the system further includes an external control input unit, and the external control input unit is connected to the interrupt processing unit and configured to receive an external control signal, transmit the external control signal to the interrupt processing unit, and activate, when the heterogeneous computing system completes a start-up program, a corresponding application; and the system further includes a display device connected to the central processing unit and the FPGA unit, and the display device is configured to receive and display, after the central processing unit or the FPGA unit processes the image data, the processed image data.

In some embodiments of the present disclosure, the system further includes a display output unit, the display output unit is configured to convert image data stored in the system memory unit into a format required by the display unit and transmit the converted image data to the display unit.

In some embodiments of the present disclosure, the display device includes a universal input interface or a specific input interface; the universal input interface includes a high definition multimedia interface or a display port interface; and the specific input interface includes a low voltage differential signaling interface.

In some embodiments of the present disclosure, the system memory unit includes a universal memory module or a memory chip.

According to another aspect of the present disclosure, a heterogeneous computing system is provided and includes: an interrupt processing unit configured to monitor whether an interrupt request is received and transmit, when it is determined that the interrupt request is received, the interrupt request to a central processing unit, so as to run a corresponding process; an FPGA unit configured to execute hardware algorithm running and an input/output hardware implementation; an image input unit connected to the FPGA unit and the central processing unit and configured to acquire externally inputted image data and image data generated by the central processing unit, so that the central processing unit or the FPGA unit reads the image data; and a system memory unit connected to the central processing unit and the FPGA unit and configured to provide a storage space for the central processing unit and the FPGA unit; wherein the central processing unit is configured to coordinate system running, assist a calculation process, adjust a system process, and control an interrupt process.

In some embodiments of the present disclosure, the system further includes an external control input unit, and the external control input unit is connected to the interrupt processing unit and configured to receive an external control signal, transmit the external control signal to the interrupt processing unit, and activate, when the heterogeneous computing system completes a start-up program, a corresponding application.

In some embodiments of the present disclosure, the system further includes a display device connected to the central processing unit and the FPGA unit, and the display device is configured to receive and display, after the central processing unit or the FPGA unit processes the image data, the processed image data.

In some embodiments of the present disclosure, the system further includes a display output unit, the display output unit is configured to convert image data stored in the system memory unit into a format required by the display unit and transmit the converted image data to the display unit.

In some embodiments of the present disclosure, the display device includes a universal input interface or a specific input interface; the universal input interface includes a high definition multimedia interface or a display port interface; and the specific input interface includes a low voltage differential signaling interface.

In some embodiments of the present disclosure, the system memory unit includes a universal memory module or a memory chip.

According to yet another aspect of the present disclosure, a heterogeneous computing method using the above-mentioned heterogeneous computing system is provided and includes: executing an initialization operation by the heterogeneous computing system; monitoring, by the interrupt processing unit, whether an interrupt request is received, and transmitting the interrupt request to the central processing unit when it is determined that the interrupt request is received; executing, by the central processing unit, a preliminary process to generate mid-term image data according to image data inputted by the image input unit; and after the FPGA unit receives the mid-term image data, performing, by a hardware image algorithm, a calculation operation on the mid-term image data to acquire final image data and outputting the final image data to a display device.

In some embodiments of the present disclosure, the step of executing the initialization operation by the heterogeneous computing system includes: initializing an operating system of the heterogeneous computing system after the heterogeneous computing system starts up; activating an application by an external control input unit; and executing an initialization operation by the application.

In some embodiments of the present disclosure, before the step of executing, by the central processing unit, the preliminary process according to the image data inputted by the image input unit, the method further includes: performing a synchronous operation on a vertical signal of the display device by a display output unit.

Compared to the prior art, the embodiments of the present disclosure provide a heterogeneous computing system and a heterogeneous computing method using the system capable of executing accelerating running of a video algorithm. Furthermore, the heterogeneous computing system decreases the complexity of hardware design and the use of resources by pre-processing and simple operations. Furthermore, the required time for adjusting processes of software and hardware of the heterogeneous computing system can be efficiently decreased.

BRIEF DESCRIPTION OF DRAWINGS

The technical solution, as well as other beneficial advantages, of the present disclosure will become apparent from the following detailed description of embodiments of the present disclosure, with reference to the attached drawings.

DETAILED DESCRIPTION OF EMBODIMENTS

Figure 1:
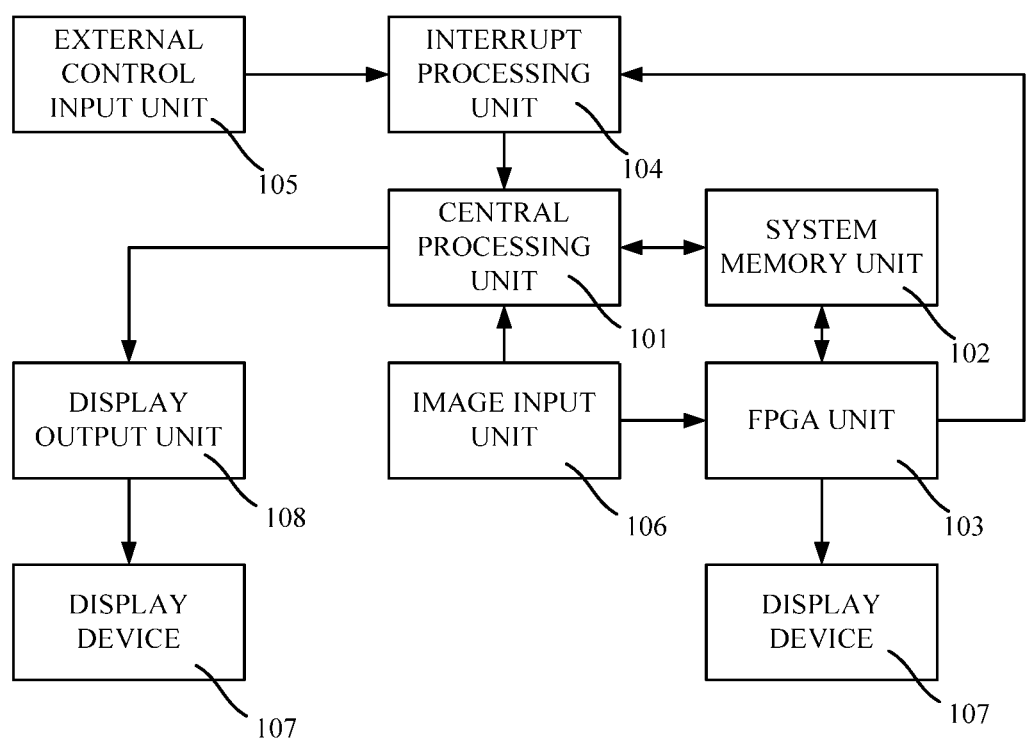
FIG. 1 illustrates an architecture diagram of a heterogeneous computing system in accordance with an embodiment of the present disclosure.

A clear and complete description of the technical schemes in the embodiments of the present disclosure is made in conjunction with the accompanying drawings in the embodiments of the present disclosure. The described embodiments are merely a part and not all of the embodiments of the present disclosure. Based on the embodiments of the present disclosure, all other embodiments acquired by those skilled in the art without any inventive efforts are within the scope of protection of the present disclosure.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein is required to have specific orientations or be constructed or operates in the specific orientations. Accordingly, the terms should not be construed as limiting the present disclosure. Furthermore, the terms "first" and "second" are for descriptive purposes only and should not be construed as indicating or implying relative importance or implying the number of technical features. As such, the features defined by the term "first" and "second" may include one or more of the features explicitly or implicitly. In the description of the present disclosure, the term "more" refers two or more than two, unless otherwise specifically defined.

In the description of the present disclosure, it should be noted that unless otherwise clearly defined and limited, the terms "mounted", "connected/coupled", and "connection" should be interoperated broadly. For example, the terms may refer to a fixed connection, a detachable connection, or an integral connection; the terms may also refer to a mechanical connection, an electrical connection, or communication with each other; the terms may further refer to a direct connection, an indirect connection through an intermediary, or an interconnection between two elements or interactive relationship between two elements. Those skilled in the art can understand the specific meanings of the above-mentioned terms in the present disclosure according to circumstances.

In the present disclosure, it should be noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that that horizontal height of the first feature is lower than that of the second feature.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated those skilled in the art.

Embodiments of the present disclosure provide a heterogeneous computing system and a heterogeneous computing method using the system capable of simplifying a development schedule of software and hardware processes and computing resources and acquiring significant increasing of a running speed, so that it is convenient to develop and verify an image algorithm of a display system rapidly.

Please refer to FIG. 1. The present disclosure provides a heterogeneous computing system including an interrupt processing unit 104, an FPGA unit 103, an image input unit 106, a system memory unit 102, and a central processing unit 101.

The interrupt processing unit 104 is configured to monitor whether an interrupt request is received and transmit, when it is determined that the interrupt request is received, the interrupt request to the central processing unit 101, so as to run a corresponding process. The interrupt processing unit 104 is connected to an external control input unit (which is described below), the central processing unit 101, and the FPGA unit 103. The interrupt processing unit 104 can receive the interrupt request transmitted from the external control input unit and transmit the corresponding interrupt request to the central processing unit 101.

The FPGA unit 103 is configured to execute hardware algorithm running and an input/output hardware implementation (which is also called a hardware practical operation) including access hardware of the system memory unit 102, input hardware of the image input unit 106, output interface hardware of a display device, and an interrupt signal generation interface.

The image input unit 106 is connected to the FPGA unit 103 and the central processing unit 101 and configured to acquire externally inputted image data and image data generated by the central processing unit 101, so that the central processing unit 101 or the FPGA unit 103 reads the image data. The image input unit 106 can acquire the externally inputted image data via a video hardware interface or an external video storage device or acquire a simple geometric image generated by the central processing unit 101. Then, the image data is read by the central processing unit 101 or the FPGA unit 103.

The system memory unit 102 is connected to the central processing unit 101 and the FPGA unit 103 and configured to provide a storage space for the central processing unit 101 and the FPGA unit 103. The system memory unit 102 includes a universal memory module or a memory chip.

The central processing unit 101 is configured to coordinate system running, assist a calculation process, adjust a system process, and control an interrupt process. When the image data is processed, the central processing unit 101 can execute a simple operation on original input data according to requirements. For example, the original input data is processed by an edge-fill algorithm, divided, or arranged. However, the image is not calculated and processed in a pixel level. As such, design complexity of a hardware image algorithm can be simplified, and running time can be reduced.

In the present embodiment, the system further includes an external control input unit 105. The external control input unit 105 is connected to the interrupt processing unit 104 and configured to receive an external control signal, transmit the external control signal to the interrupt processing unit 104, and activate, when the heterogeneous computing system completes a start-up program, a corresponding application. The external control input unit 105 includes, for example, a keyboard, a mouse, or a pin related to an input/output hardware.

Please continue to refer to FIG. 1. The system further includes a display device 107 connected to the central processing unit 101 and the FPGA unit 103. The display device 107 is configured to receive and display, after the central processing unit 101 or the FPGA unit 103 processes the image data, the processed image data. The display device 107 includes a universal input interface or a specific input interface. The universal input interface includes a high definition multimedia interface (HDMI) or a display port (DP) interface. The specific input interface includes a low voltage differential signaling (LVDS) interface or a V-by-One (VBO) interface. It is noted that the HDMI interface is a digitalized video/audio interface technology and a dedicated digitalized interface suitable for transmitting images and can transmit audio and image signals synchronously. A highest data transmitting speed is 18 Gbit/s. The DP interface allows audio and video signals to share one transmitting cable and supports various high-quality digitized audio. Besides four main transmitting channels, the DP interface further provides a powerful auxiliary channel A maximum transmitting bandwidth is 1 Mbps. A highest delay is only 500 μs. The DP interface can directly serve as a transmitting channel of speech or video data with low bandwidth. The LVDS interface uses a digital video signal transmitting method which is developed to overcome disadvantages of high power consumption and great EMI electromagnetic interferences when data with a wide band and a high bit rate is transmitted by a TTL voltage level. The VBO interface is a digital interface standard which is developed and dedicated toward image transmission. Input and output levels of signals use LVDS.

In the present embodiment, the system further includes a display output unit 108. The display output unit 108 is configured to convert the image data stored in the system memory unit 102 into a format required by the display unit and transmit the converted image data to the display unit.

In the present embodiment, the central processing unit 101 and the system memory unit 102 are further configured to initialize, when the heterogeneous computing system starts up, an operating system of the heterogeneous computing system. The operating system includes a kernel system, a root file system, and an initial program load. The root file system includes a standard library (e.g., libstdc++), an audio and video decoding and converting program (ffmpeg) and its development package, and a graphics processing unit (GPU) framebuffer driving program and its development package. The audio and video decoding and converting program is a program for running recording, converting, and stream functions of various audio and video formats and includes: libavcodec which is a decoder library used for audio and video items; and libavformat which is an audio/video format converting library. A framebuffer is a memory buffer containing a complete frame of data and driving a video display device using a video output device.

The heterogeneous computing system of the present disclosure can execute accelerating running of a video algorithm (which is also called a hardware image algorithm) by the arrangement and the use of the central processing unit 101, the system memory unit 102, the FPGA unit 103, and the interrupt processing unit 104. Furthermore, the heterogeneous computing system decreases the complexity of hardware design and the use of resources by pre-processing and simple operations. Furthermore, the heterogeneous computing system can efficiently decrease the required time for adjusting processes of software and hardware of the heterogeneous computing system by coordination of the interrupt processing unit 104 and the external control input unit 105.

Figure 2:
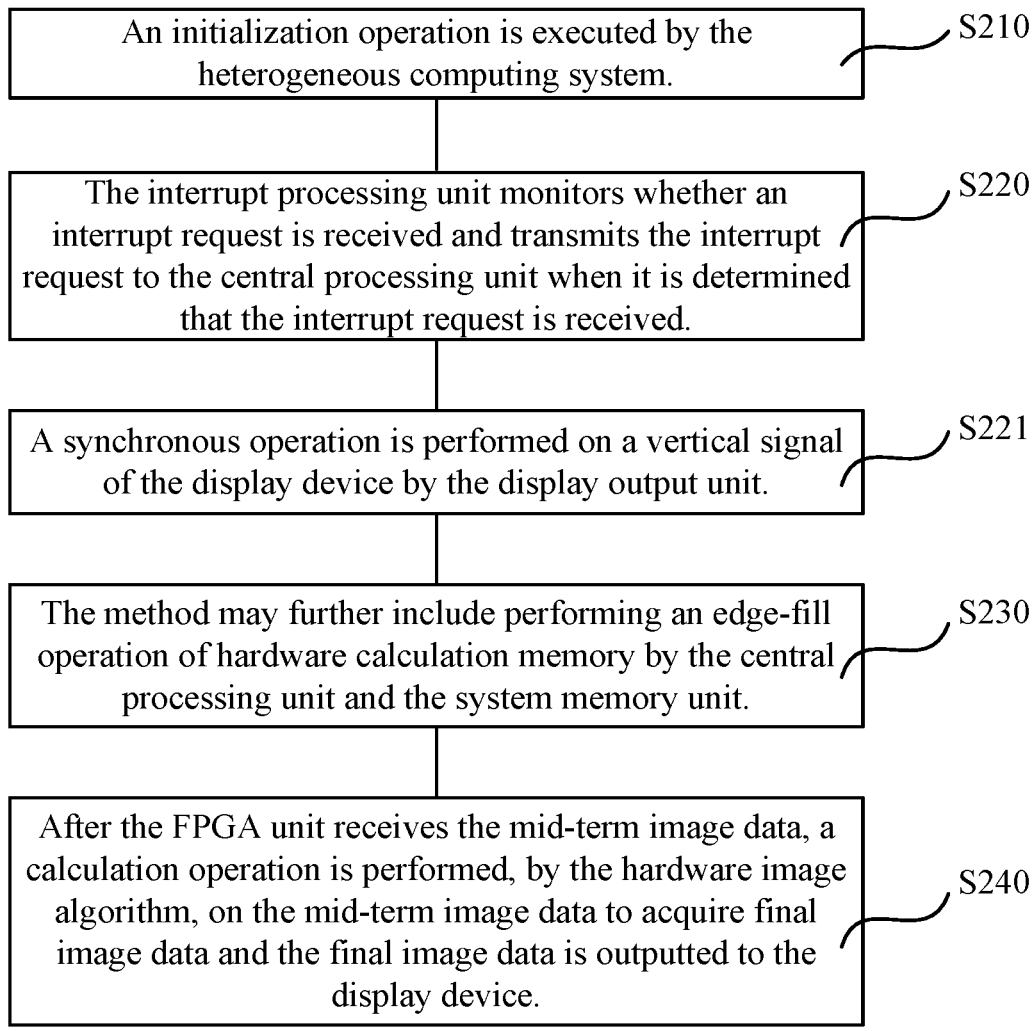
FIG. 2 illustrates a step flow chart of a heterogeneous computing method in accordance with an embodiment of the present disclosure.

Please refer to FIG. 2. FIG. 2 provides a heterogeneous computing method using the above-mentioned heterogeneous computing system. The method includes the following steps.

In step S210, an initialization operation is executed by the heterogeneous computing system.

Figure 3:
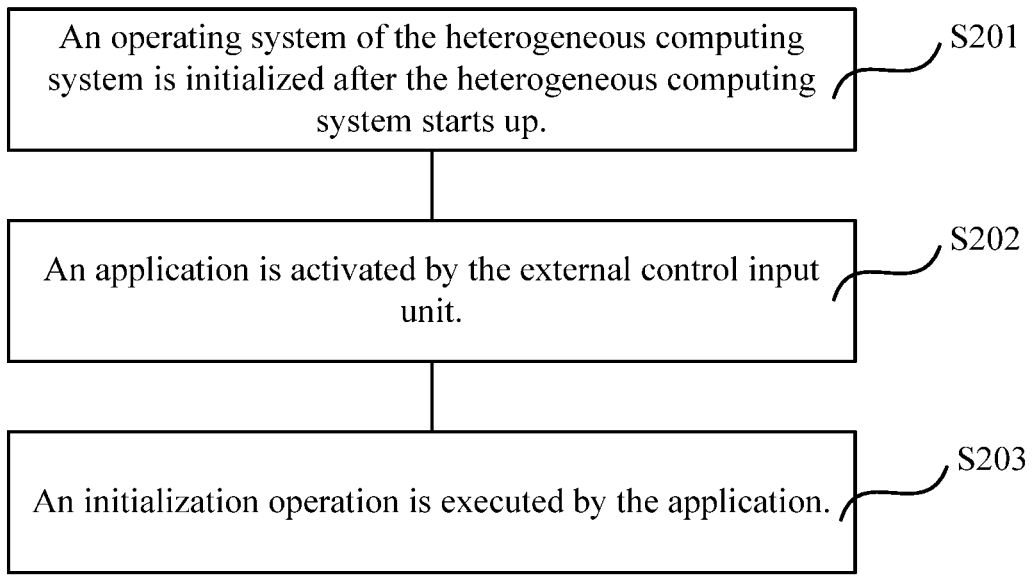
FIG. 3 illustrates a step flow chart of step S210 in FIG. 2.

Please refer to FIG. 3. Step S210 includes the following steps.

In step S201, an operating system of the heterogeneous computing system is initialized after the heterogeneous computing system starts up.

In the present step, the operating system (a Linux operating system herein) of the heterogeneous computing system is initialized and includes a kernel system, a root file system, and an initial program load. The root file system at least includes a standard library (e.g., libstdc++), an audio and video decoding and converting program (ffmpeg) and its development package, and a graphics processing unit (GPU) framebuffer driving program and its development package.

In step S202, an application is activated by the external control input unit.

In step S203, an initialization operation is executed by the application.

Figure 4:
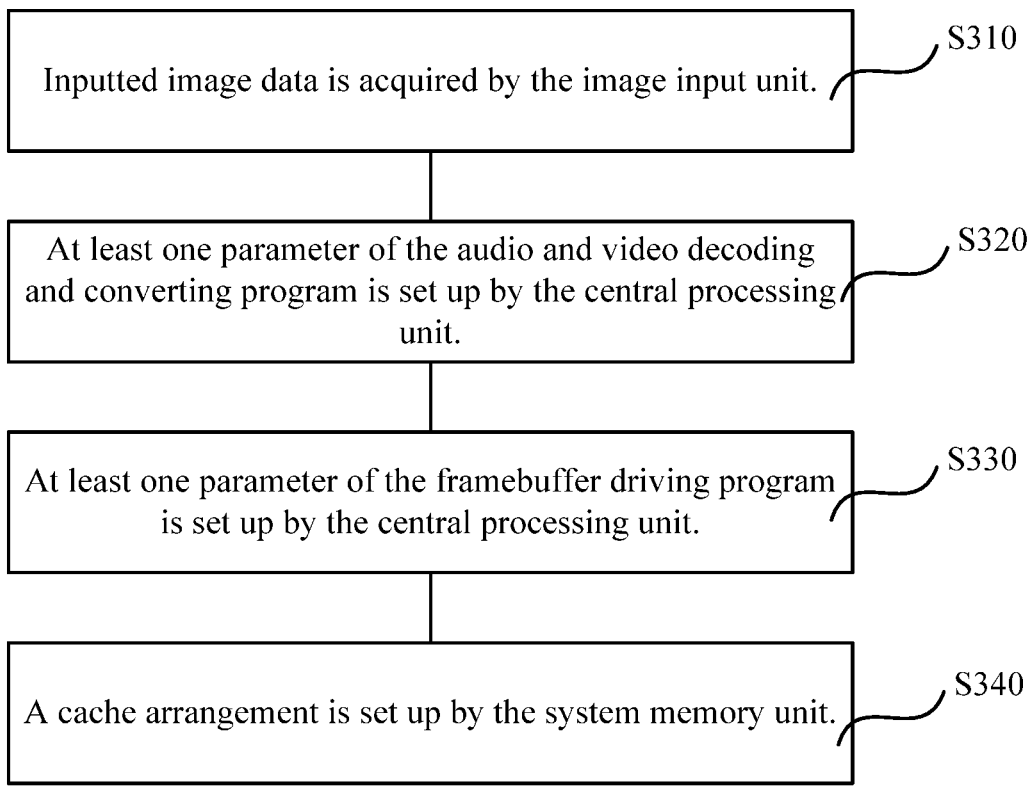
FIG. 4 illustrates a step flow chart of step S203 in FIG. 3.

Please refer to FIG. 4. Step S203 includes the following steps.

In step S310, inputted image data is acquired by the image input unit.

In step S320, at least one parameter of the audio and video decoding and converting program is set up by the central processing unit.

In step S330, at least one parameter of the framebuffer driving program is set up by the central processing unit.

In steps S320 and S332, the audio and video decoding and converting program and related program(s) thereof and the display output unit are initialized according to practical requirements.

In detail, at least one parameter of the audio and video decoding and converting program includes: an image file path, an image compression coding format, a decoder, a number of parallel encoding threads, and so on.

At least one parameter of the framebuffer driving program includes: a horizontal position, a vertical position, a width, a height, an output format, and so on of a displayed image.

In step S340, a cache arrangement is set up by the system memory unit.

In the present step, the cache arrangement is set up by the system memory unit and the central processing unit, so that the system memory unit can provide memory resources required by a hardware image algorithm (which is completed by the FPGA unit) and a hardware calculation and coordination processing program (which is completed by the central processing unit). Furthermore, continuous physical states (i.e., continuous states of a physical address) are provided for the hardware image algorithm which is executed and for an adjustment operation (which is completed by plural FPGA units) of an output format of a hardware display device. As such, execution efficiency of hardware can be increased.

In addition, a double buffer technique is provided according to requirements of the units to avoid data access conflicts. In detail, the double buffer can be provided for a required output after an image is decoded by the audio and video decoding and converting program. Alternatively, the double buffer arrangement can be provided for a required input and output of a hardware function module, a required input and output of a hardware calculation and assistance process, or a required output of the display device. As such, accuracy of data read and writing operations can be guaranteed.

In step S220, the interrupt processing unit monitors whether an interrupt request is received and transmits the interrupt request to the central processing unit when it is determined that the interrupt request is received.

After the initialization of the operating system is completed, the application enters a state of an infinite loop. When the interrupt request is checked, step S230 is performed to process the inputted image data one-by-one frame after the interrupt request is processed. The processing of the interrupt request may be, for example, an interrupt request of a keyboard function and may include: pausing an image decoding behavior to make the image remain in a current display state, so as to view image quality; and printing running time of each step of the program, so as to optimize the processes of the program. Certainly, the processing of the interrupt request is not limited thereto. As such, the required time for adjusting processes of software and hardware of the heterogeneous computing system can be efficiently decreased by coordination of the interrupt processing unit and the external control input unit.

In step S230, the central processing unit executes a preliminary process to generate mid-term image data according to the image data inputted by the image input unit.

When the image data is processed, the central processing unit can execute a simple operation on original input data according to requirements. For example, the original input data is processed by an edge-fill algorithm, divided, or arranged. However, the image is not calculated and processed in a pixel level. As such, design complexity of a hardware image algorithm can be simplified, and running time can be reduced.

After the image data is inputted by the image input unit, the central processing unit acquires original image data (i.e., original YUV data) by a decoding function of the audio and video decoding and converting program and executes a stop encoding function in coordination with the interrupt processing unit. It is noted that the audio and video decoding and converting program is implemented by, but not limited to, software. The central processing unit can decode, in coordination with an audio and video decoder, the image data inputted by the image input unit to acquire the original data image.

Furthermore, the method may include step S221 before step S230. In step S221, a synchronous operation is performed on a vertical signal of the display device by the display output unit.

A vsync synchronous signal of the display device (i.e., the vertical signal of the display device) is processed by the display output unit. The vsync synchronous signal of the display device is mainly configured to detect an output state of the display device. Before it is determined that a new vsync synchronous signal reaches, a current display buffer cannot be modified to avoid image tear phenomenon. As such, it can be guaranteed that the writing of the processed image data does not affect the currently displayed image data. Then, a decoding calculation is performed on each frame to acquire the original image data in step S230.

After step S230, the method may further include performing an edge-fill operation of hardware calculation memory by the central processing unit and the system memory unit.

The edge-fill operation of hardware calculation memory refers to an auxiliary calculation performed on the FPGA unit. For example, an edge-fill operation required by a bicubic interpolation algorithm or an FSRCNN-S algorithm is completed in advance. As such, running efficiency of the FPGA unit can be accelerated, and resource requirements of accelerating hardware can be simplified.

In step S240, after the FPGA unit receives the mid-term image data, a calculation operation is performed, by the hardware image algorithm, on the mid-term image data to acquire final image data and the final image data is outputted to the display device.

After plural FPGA units perform massive homogeneous operations (i.e., massive image pixel parallel calculations) by the hardware image algorithm (or universal parallel calculation manner), image calculation efficiency can meet an image output requirement of ultra HD with 4K@30 Hz. The acquired final image data is outputted to display device for display. The hardware image algorithm is described with a high-level language in an initial stage. The hardware image algorithm is replaced with a register transfer language (RTL) in a final stage.

Compared to the prior art, the embodiments of the present disclosure provide a heterogeneous computing system and a heterogeneous computing method using the system capable of executing accelerating running of a video algorithm. Furthermore, the heterogeneous computing system decreases the complexity of hardware design and the use of resources by pre-processing and simple operations. Furthermore, the required time for adjusting processes of software and hardware of the heterogeneous computing system can be efficiently decreased.

In the foregoing embodiments, the description of the various embodiments has respective different emphases, and a part in one of the embodiments which is not described in detail can be referred to the related description of other embodiments.

The heterogeneous computing system and the heterogeneous computing method using the system provided by the embodiments of the present disclosure are described in detail as above. The embodiments are used to describe the principle and the implementations of the present disclosure. It should be understood that the present disclosure is not limited to the exemplary examples. Those skilled in the art may achieve equivalent improvements or replacements according to the above description. The equivalent improvements and replacements should be considered to belong to the protection scope of the present disclosure.

What is claimed is:

1. A heterogeneous computing system, comprising:
   an interrupt processing unit configured to monitor whether an interrupt request is received and transmit, when it is determined that the interrupt request is received, the interrupt request to a central processing unit, so as to run a corresponding process;
   an FPGA unit configured to execute hardware algorithm running and an input/output hardware implementation;
   an image input unit connected to the FPGA unit and the central processing unit and configured to acquire externally inputted image data and image data generated by the central processing unit, so that the central processing unit or the FPGA unit reads the image data; and
   a system memory unit connected to the central processing unit and the FPGA unit and configured to provide a storage space for the central processing unit and the FPGA unit;
   wherein the central processing unit is configured to coordinate system running, assist a calculation process, adjust a system process, and control an interrupt process;
   the system further comprises an external control input unit, and the external control input unit is connected to the interrupt processing unit and configured to receive an external control signal, transmit the external control signal to the interrupt processing unit, and activate, when the heterogeneous computing system completes a start-up program, a corresponding application;
   the system further comprises a display device connected to the central processing unit and the FPGA unit, and the display device is configured to receive and display, after the central processing unit or the FPGA unit processes the image data, the processed image data; and
   the system memory unit provides memory resources required by a hardware image algorithm which is completed by the FPGA unit and a hardware calculation and coordination processing program which is completed by the central processing unit.

2. The heterogeneous computing system of claim 1, wherein the system further comprises a display output unit, the display output unit is configured to convert image data stored in the system memory unit into a format required by the display unit and transmit the converted image data to the display unit.

3. The heterogeneous computing system of claim 1, wherein the display device comprises a universal input interface or a specific input interface;
   the universal input interface comprises a high definition multimedia interface or a display port interface; and
   the specific input interface includes a low voltage differential signaling interface.

4. The heterogeneous computing system of claim 1, wherein the system memory unit comprises a universal memory module or a memory chip.

5. A heterogeneous computing system, comprising:
   an interrupt processing unit configured to monitor whether an interrupt request is received and transmit, when it is determined that the interrupt request is received, the interrupt request to a central processing unit, so as to run a corresponding process;
   an FPGA unit configured to execute hardware algorithm running and an input/output hardware implementation;
   an image input unit connected to the FPGA unit and the central processing unit and configured to acquire externally inputted image data and image data generated by the central processing unit, so that the central processing unit or the FPGA unit reads the image data; and
   a system memory unit connected to the central processing unit and the FPGA unit and configured to provide a storage space for the central processing unit and the FPGA unit;

wherein the central processing unit is configured to coordinate system running, assist a calculation process, adjust a system process, and control an interrupt process; and the system memory unit provides memory resources required by a hardware image algorithm which is completed by the FPGA unit and a hardware calculation and coordination processing program which is completed by the central processing unit.

6. The heterogeneous computing system of claim 5, wherein the system further comprises an external control input unit, and the external control input unit is connected to the interrupt processing unit and configured to receive an external control signal, transmit the external control signal to the interrupt processing unit, and activate, when the heterogeneous computing system completes a start-up program, a corresponding application.

7. The heterogeneous computing system of claim 5, wherein the system further comprises a display device connected to the central processing unit and the FPGA unit, and the display device is configured to receive and display, after the central processing unit or the FPGA unit processes the image data, the processed image data.

8. The heterogeneous computing system of claim 7, wherein the system further comprises a display output unit, the display output unit is configured to convert image data stored in the system memory unit into a format required by the display unit and transmit the converted image data to the display unit.

9. The heterogeneous computing system of claim 7, wherein the display device comprises a universal input interface or a specific input interface;
the universal input interface comprises a high definition multimedia interface or a display port interface; and
the specific input interface includes a low voltage differential signaling interface.

10. The heterogeneous computing system of claim 5, wherein the system memory unit comprises a universal memory module or a memory chip.

11. A heterogeneous computing method using the heterogeneous computing system of claim 5, wherein the method comprises:

executing an initialization operation by the heterogeneous computing system;

monitoring, by the interrupt processing unit, whether an interrupt request is received, and transmitting the interrupt request to the central processing unit when it is determined that the interrupt request is received;

executing, by the central processing unit, a preliminary process to generate mid-term image data according to image data inputted by the image input unit; and after the FPGA unit receives the mid-term image data, performing, by a hardware image algorithm, a calculation operation on the mid-term image data to acquire final image data and outputting the final image data to a display device.

12. The heterogeneous computing method of claim 11, wherein the step of executing the initialization operation by the heterogeneous computing system comprises:

initializing an operating system of the heterogeneous computing system after the heterogeneous computing system starts up;

activating an application by an external control input unit; and executing an initialization operation by the application.

13. The heterogeneous computing method of claim 12, wherein the step of executing the initialization operation by the application comprises:

acquiring inputted image data by the image input unit;

setting up at least one parameter of an audio and video decoding and converting program by the central processing unit;

setting up at least one parameter of a framebuffer driving program by the central processing unit; and setting up a cache arrangement by the system memory unit.

14. The heterogeneous computing method of claim 11, wherein before the step of executing, by the central processing unit, the preliminary process according to the image data inputted by the image input unit, the method further comprises:

performing a synchronous operation on a vertical signal of the display device by a display output unit.

* * * * *